United States Patent
Seo

(10) Patent No.: US 7,145,857 B2
(45) Date of Patent: Dec. 5, 2006

(54) APPARATUS AND METHOD FOR GENERATING WRITE PULSE APPROPRIATE FOR VARIOUS OPTICAL RECORDING MEDIA

(75) Inventor: Jin-gyo Seo, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 495 days.

(21) Appl. No.: 10/330,347

(22) Filed: Dec. 30, 2002

(65) Prior Publication Data

US 2003/0142607 A1    Jul. 31, 2003

(30) Foreign Application Priority Data

Jan. 18, 2002    (KR) .................................. 2002-2999

(51) Int. Cl.
 *G11B 7/045* (2006.01)
(52) U.S. Cl. .................................. 369/59.11; 369/59.12
(58) Field of Classification Search .............. 369/59.11, 369/59.12
 See application file for complete search history.

(56) References Cited

U.S. PATENT DOCUMENTS

| 5,457,666 | A | * | 10/1995 | Toda et al. | .............. | 369/13.24 |
| 5,790,482 | A | * | 8/1998 | Saga et al. | ................ | 369/13.27 |
| 6,018,508 | A | | 1/2000 | Hasegawa | | |
| 6,459,670 | B1 | | 10/2002 | Kuwahara et al. | | |
| 6,611,481 | B1 | * | 8/2003 | Koishi et al. | ............ | 369/47.53 |
| 6,801,240 | B1 | * | 10/2004 | Abe et al. | .................... | 347/252 |

FOREIGN PATENT DOCUMENTS

| EP | 1 058 240 | 12/2000 |
| JP | 10-064065 | 3/1998 |
| JP | 11-213389 | 8/1999 |
| JP | 11273076 | 8/1999 |
| JP | 11-273076 | 10/1999 |
| JP | 2000-011382 | 1/2000 |
| JP | 2000-030255 | 1/2000 |
| JP | 2000-215449 | 8/2000 |
| JP | 2000-285464 | 10/2000 |
| JP | 2001-073202 | 3/2001 |
| JP | 2001176073 | 6/2001 |
| JP | 2001-184792 | 7/2001 |
| JP | 2001-209940 | 8/2001 |
| JP | 2001-344754 | 12/2001 |
| JP | 2002-269744 | 9/2002 |
| JP | 2001-367288 | 6/2003 |
| JP | 2003-176530 | 6/2003 |

* cited by examiner

*Primary Examiner*—Thang V. Tran
*Assistant Examiner*—Adam R. Giesy
(74) *Attorney, Agent, or Firm*—Staas & Halsey LLP

(57) ABSTRACT

A write pulse generating apparatus includes a control unit which provides information on an optical recording medium type and information on a recording speed factor, and a control signal generating unit which determines a multi-pulse type which is to be generated in a multi-pulse interval based on the information recording medium type and recording speed factor. The generating unit generates a signal for controlling the light emitting device driving unit to generate a write pulse having the determined multi-pulse type. A control unit sets the level of the write pulse for up to an entire interval of a write mark and/or a write space according to the optical recording medium type and the recording speed factor.

29 Claims, 7 Drawing Sheets

APPARATUS AND METHOD FOR GENERATING WRITE PULSE APPROPRIATE FOR VARIOUS OPTICAL RECORDING MEDIA

CROSS-REFERENCE TO RELATED APPLICATION

This application claims the benefit of Korean Application No. 2002-2999, filed Jan. 18, 2002 in the Korean Intellectual Property Office, the disclosure of which is incorporated herein by reference.

BACKGROUND OF THE INVENTION

1. Field of the Invention

The present invention relates to an apparatus and method of generating a write pulse appropriate for a variety of optical recording media, and more particularly, to an apparatus and method of generating a write pulse so as to be compatible with a variety of optical recording media at a variety of speeds for recording.

2. Description of the Related Art

Optical recording media proposed presently can be divided into Compact Discs (CDs) and Digital Versatile Discs (DVDs). Optical apparatuses for CD-Rs and CD-RWs, which are types of CDs, are standardized and are widely used. Optical apparatuses for DVD-RWs, DVD-Rs, DVD+RWs, and DVD-RAMs, which are types of DVDs, are also presently offered. However, since write characteristics are different for these CD and DVD types, the types of write pulses for the optical recording media are also different. Also, since the write characteristics are different according to the speed for recording of each optical recording medium, the types of the write pulses vary depending on the speed for recording of the optical recording medium.

For example, a multi-pulse train for the write pulses of the DVD-RAM or the CD-RW starts from a "high" logic level in a channel clock, and are referred to as an "on-start" pulse type. Additionally, the multi-pulse train for the write pulses of the DVD±RW or the DVD-R starts from a "low" logic level in a channel clock, and thus can be referred to as an "off-start" multi-pulse type. Further, the write pulse of the CD-R is not the multi-pulse but is similar to a Non-Return to Zero Invert (NRZI). Therefore, the write pulse of the CD-R can be referred to as the Non-Multi-pulse type.

Therefore, in order to accommodate a variety of optical recording media types in one optical apparatus, there has been proposed an apparatus which generates a write pulse appropriate for each optical recording medium type. The write pulse generating apparatus counts the start position and the end position of each of a first pulse, a multi-pulse train, a last pulse, and a cooling pulse (also referred to as a bottom pulse) forming a write pulse appropriate for each optical recording medium type. The count is on the basis of the start point and the end point of a write mark (domain). Then, using the counted values, the apparatus generates a bias 3 control signal (also referred to as a bottom control signal), an erase control signal (also referred to as a bias 1 control signal), a peak control signal and a cooling control signal (also referred to as a bias 2 control signal) so as to control a Laser Diode (LD) driving unit to generate a desired write pulse.

Also, a write pulse generating apparatus has been proposed which changes a pulse width of the multi-pulse train in order to provide a write pulse appropriate for high density and high speed factor optical recording media.

However, in these write pulse generating apparatuses, a write current channel, which is input to an LD driving unit, is fixed. That is, the current transmission channel, which is input to the LD driving unit, is fixedly formed with a read current transmission channel, a peak current transmission channel, an erase current transmission channel, a cooling current transmission channel, and a bottom current transmission channel. Also, signals for controlling the LD driving unit fixedly include a bias control signal, an erase control signal, a peak control signal, and a cooling control signal. In addition, these conventional write pulse generating apparatuses mainly use a method which varies the width of the write pulse.

However, as higher speed factor media are being developed, the width of the write pulse of the write mark (domain) is being proportionately narrowed. Also, as users demand one optical apparatus to record and reproduce data for all kinds of optical recording media, the types of write pulses required for recording and reproducing data for each type of optical recording medium become more diversified. Therefore, a method which varies the width of the write pulse, in which the current transmission channels and the number of control signals used in selecting current transmission channels are fixed, as in the conventional write pulse generating apparatuses, cannot satisfy the demands for providing a variety of write pulse types.

SUMMARY OF THE INVENTION

To solve the above and other problems, it is an aspect of the present invention to provide a write pulse generating apparatus and method of generating a write pulse appropriate for the types and speed factors of different optical recording media.

It is another aspect of the present invention to provide a write pulse generating apparatus and method in which one of a write pulse of a non-multi-pulse type and a write pulse of a multi-pulse type is generated according to the types and speed factors of different optical recording media.

It is a further aspect of the present invention to provide a write pulse generating apparatus and method in which one of a write pulse of a plurality of non-multi-pulse types and a write pulse of a plurality of multi-pulse types is generated according to the types and speed factors of different optical recording media.

It is an additional aspect of the present invention to provide a write pulse generating apparatus and method in which the level of a write pulse in the entire interval or a part of the interval of a write mark and/or a write space is changed and generated according to the types and speed factors of different optical recording media.

It is a still further aspect of the present invention to provide a write pulse generating apparatus and method in which the level of a write pulse is changed and generated according to the types and speed factors of different optical recording media by increasing a current (or voltage) used for automatic power control of a laser diode, without adding a separate hardware channel path.

Additional aspects and advantages of the invention will be set forth in part in the description which follows and, in part, will be obvious from the description, or may be learned by practice of the invention.

To accomplish the above and for other aspects of the present invention, there is provided a write pulse generating apparatus according to an embodiment of the invention which generates a write pulse for an optical recording medium using a light emitting device, wherein the apparatus determines a pulse type of a multi-pulse interval of the write pulse from a non-multi-pulse type and a multi-pulse type based on information on a type and a current recording speed factor of the optical recording medium, and the light emitting device generates the write pulse having the determined pulse type.

According to another embodiment of the invention, a write pulse generating apparatus selects and generates a write pulse appropriate for an optical recording medium by controlling a light emitting device using a light emitting device driving unit so that a desired write pulse is generated, the write pulse generating apparatus including a control unit which provides information on a type of the optical recording medium and information on a recording speed factor; and a control signal generating unit which determines a type of a multi-pulse which is to be generated in a multi-pulse interval based on the information on the type and recording speed factor of the optical recording medium which is provided by the control unit, and generates a signal to control the light emitting device driving unit so that a write pulse having the determined multi-pulse type is generated by the light emitting device.

According to an aspect of the invention, the control signal generating unit selects and determines the type of the multi-pulse to be generated in the multi-pulse interval as being one of a non-multi-pulse type and a multi-pulse train.

According to another aspect of the invention, the control signal generating unit generates and transmits a control signal to the light emitting device driving unit in order to change up to an entire level of the multi-pulse interval of the write pulse generated from the light emitting device.

According to a further embodiment of the invention, a write pulse generating apparatus generates a write pulse appropriate for an optical recording medium and controls a light emitting device driving unit, the apparatus including a control unit which sets a level of the write pulse for up to an entire interval of a write mark and/or a write space of the optical recording medium according to a type of the optical recording medium and a recording speed factor; and a control signal generating unit which is controlled by the control unit and generates a control signal to change the level of the write pulse for each interval of the write mark and/or the write space, and sends the control signal to the light emitting device driving unit.

According to an aspect of the invention, the control unit sets the level of the write pulse such that the level of the write pulse increases or decreases from a reference level which is set for each partial interval.

According to yet another embodiment of the invention, a write pulse generating apparatus generates a write pulse appropriate for an optical recording medium, the apparatus including a light emitting device which emits light corresponding to a write pulse to the optical recording medium; a driving unit which drives the light emitting device such that the generated write pulse is determined according to the types of different optical recording media and a recording speed factors; a light receiving unit which receives light which is reflected from a received optical recording medium and generates an output signal; a power control signal providing unit which provides a signal to control power for each channel to the driving unit using the output signal and a predetermined reference voltage in order to automatically control power needed in the light emitting device; a control signal generating unit which generates a signal to control whether to send the power control signal, which is for each channel and is input to the driving unit, such that the level of the write pulse is variably adjusted in up to an entire interval of a write mark and/or a write space to be formed on the optical recording medium according to the determined type of the optical recording medium and the recording speed factor, and sends the generated signal to the driving unit; and a control unit which controls whether to generate a control signal in the control signal generating unit and the pulse type of the control signal according to the determined type of the optical recording medium and the recording speed factor.

According to an aspect of the invention, the control signal generating unit includes a write pulse generating condition setting unit which sets the generating conditions of the write pulse according to information on the determined type and recording speed factor of the optical recording medium provided by the control unit, a multi-pulse determining unit which determines the pulse type of a multi-pulse interval according to the information on the determined type and recording speed factor of the optical recording medium provided by the control unit, a pulse generator group which independently generates pulses to form the write pulse based on signals output from the write pulse generating condition setting unit and the multi-pulse determining unit, respectively, first information on the current write mark, and second information on a previous space mark and a next space mark of the current write mark, and a control signal generating circuit which is controlled by the control unit and which selects needed pulses in the pulses generated by the pulse generator group, and forms and generates the control signal.

According to another aspect of the invention, the control signal generating circuit includes a matrix circuit which independently determines whether to send pulses generated from first through seventh pulse generators according to the control signal provided by the control unit in order to change the level of the write pulse so that the level of the write pulse in up to the entire interval of the write mark and/or write space increases from the reference level of each corresponding interval, and generates and transmits at least one control signal obtained by the determined result to the driving unit.

According to yet another aspect of the invention, the control signal is formed with bit information which is updated whenever there is a change in the type and recording speed factor of the optical recording medium, and is stored in a peak register, an erase register, a cooling register, a bottom register, a read register, and an auxiliary register, the control unit includes a register file which stores bit information for each register unit, and the matrix circuit provides the driving unit with control signals obtained by combining pulses generated in the pulse generator group such that the level of the write pulse of the entire interval or a partial interval of the write mark increases or decreases by the same amount as the amount of a power control signal, which is sent through a predetermined channel, by the control signal provided by the control unit.

According to still another aspect of the invention, in the power control signal providing unit, a voltage divider divides voltages and is connected to at least one channel and a power control signal, which is output from the divider and is provided as an auxiliary power control signal of the driving unit so as to increase a number of power control signals used for automatic power control of the light emitting device.

According to still another embodiment of the invention, a write pulse generating method which generates a write pulse appropriate for an optical recording medium using a light emitting device, the method including determining a pulse type of a multi-pulse interval of a write pulse generated from the light emitting device as one of a non-multi-pulse type and a multi-pulse type according to a determined type of the optical recording medium and a recording speed factor; and controlling the generation of the write pulse such that the write pulse having the determined pulse type is generated from the light emitting device.

According to a further embodiment of the invention, a write pulse generating method which generates a write pulse appropriate for an optical recording medium using a light emitting device, the method including determining a pulse type of a multi-pulse interval included in a write pulse generated from the light emitting device according to a determined type of the optical recording medium and the recording speed factor, generating a signal which controls whether to send a power control signal provided for each of a plurality of channels in order to drive the light emitting device such that a write pulse having the determined pulse type is emitted from the light emitting device, and driving the light emitting device with the power control signal which is sent through a channel selected by the control signal.

According to an aspect of the invention, the generating the control signal includes determining a condition of a combination of pulses needed to form the write pulse according to a determined level of the write pulse, and obtaining at least one signal by combining pulses generated according to the determined combination condition as the control signal.

According to another aspect of the invention, the generating the control signal comprises determining the combination condition so that the needed pulses are selected from among a read laser diode on (Read_LD ON) pulse, a bottom (bias 3) pulse, a cooling (bias 2) pulse, an erase (bias 1) pulse, a plurality of multi-pulses, a plurality of non-multi-pulses, a last pulse, and a first pulse, and generating at least one of a peak control signal, an erase (bias 1) control signal, a cooling (bias 2) control signal, a bottom (bias 3) control signal, a read control signal, and an auxiliary control signal is generated as the control signal.

According to yet another aspect of the invention, the determining the write pulse level includes increasing or decreasing the level of the write pulse based on a reference level of each interval in the write pulse, and determining the amount of the increase or the decrease the write pulse level.

According to still another aspect of the invention, the method further includes determining the pulse type of a multi-pulse interval included in the write pulse according to the type and the recording speed of the optical recording medium.

According to still yet another aspect of the invention, the determining the type of the multi-pulse includes determining whether the pulse type of the multi-pulse interval is a non-multi-pulse type according to the determined type and recording speed factor of the optical recording medium, determining whether the pulse type is an on-start multi-pulse type if the pulse type of the multi-pulse interval is not the non-multi-pulse type, and determining that the pulse type is an off-start multi-pulse type if the pulse type of the multi-pulse interval is neither the non-multi-pulse type nor the on-start multi-pulse type.

BRIEF DESCRIPTION OF THE DRAWINGS

The above and other objects and advantages of the present invention will become more apparent and more readily appreciated by describing in detail embodiments thereof with reference to the accompanying drawings in which.

DESCRIPTION OF THE EMBODIMENTS

Figure 1:
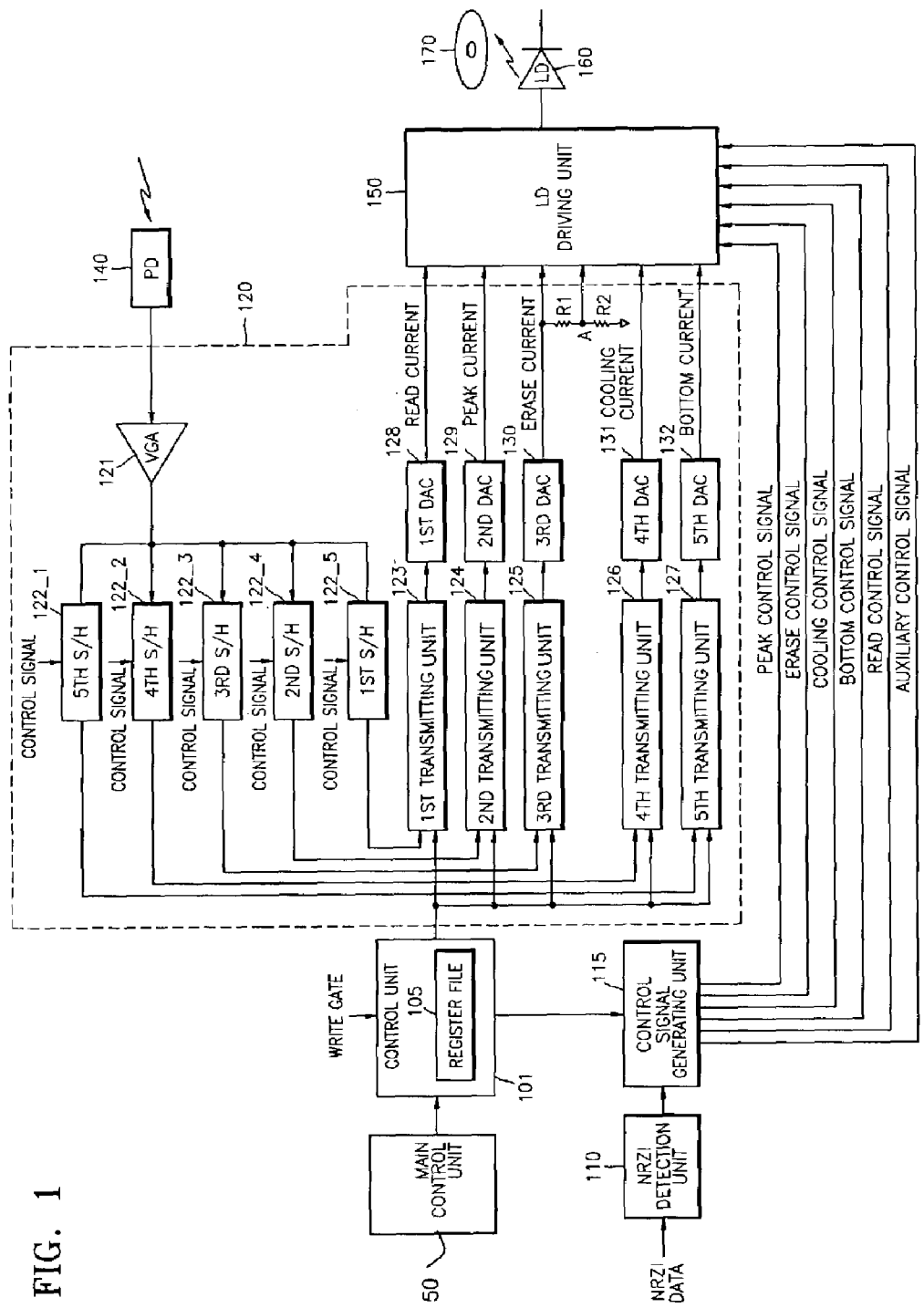
FIG. 1 is a block diagram of a write pulse generating apparatus appropriate for a variety of optical recording media according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Referring to FIG. 1, the write pulse generating apparatus according to an embodiment of the present invention includes a control unit 101, an NRZI detection unit 110, a control signal generating unit 115, a current providing unit 120, a photo diode 140, a Laser Diode (LD) driving unit 150, and an LD 160 which illuminates an optical recording medium 170.

The control unit 101 controls the control signal generating unit 115 and the current providing unit 120 so that a write pulse for a write mark and a write space can be generated with an optical level according to the type and recording speed factor of the optical recording medium 170, which is one of a plurality of different types of optical recording media having corresponding speed factors. The control unit 101 operates when a write signal, which is transmitted from an ENcoder & DEcoder (ENDEC) (not shown) in the corresponding optical drive, is activated. The control unit 101 sets the values of a register file 105 based on information on the type and recording speed factor of the optical recording medium 170, which is provided from a main control unit 50. The register file 105 stores data for controlling whether to generate a control signal in the control signal generating unit 115 and a pulse type of the control signal to be generated. That is, the register file 105 stores data for determining the level of the write pulse in the entire interval or a part of the interval of a current write mark and/or a current write space, and data for generating the write pulse having the determined level.

Specifically, based on a reference level of each interval of a write mark and/or a write space, according to the type and speed factor information of the received optical recording medium 107, the control unit 101 determines whether to raise, lower, or maintain the level of each interval of a write pulse which is desired to be generated at present. The control unit 101 sets the data stored in the register file 105 so that the level of the write pulse determined for each interval can be generated. For each type of optical recording media, the reference level of each of a first pulse, a multi-pulse train, a last pulse, and a cooling pulse that form a write pulse is set to form a write mark (domain).

The control unit 101 prepares the reference level for each type of optical recording media in advance. Therefore, if the type and recording speed factor information of the received optical recording medium 107 is input from the main control unit 50, the control unit 101 can determine whether to raise, lower, or maintain the level of the write pulse which is to be generated in each pulse interval based on the reference levels. As shown, the control unit 101 also sets a level for an erase pulse as an important level for erase or overwrite of a write mark (domain) of a write space region in a rewritable optical recording medium. Thus, data stored in the register file 105 is updated by information sent from the main control unit 50 whenever the type and recording speed factor of the optical recording medium are changed.

An embodiment of the register file 105 is shown in Table 1:

read control signal. The auxiliary switch is a signal to control whether the control signal generating unit 115 is to generate an auxiliary control signal, which is generated to control the pulse type of the auxiliary control signal.

Bits stored in each register of the register file 105 are data to control whether the control signal generating unit 115 is to generate a control signal, and to control the pulse type of the control signal. In the register file of Table 1, the most significant bit, bit 7, of each register is data to control whether to enable a channel. Bit 6 of each register is data to control whether to transmit a read laser diode on (Read_LD ON) signal. Bit 5 of each register is data to control whether to transmit a first pulse. Bit 4 of each register is data to control whether to transmit a last pulse. Bit 3 of each register is data to control whether to transmit a multi-pulse. Bit 2 of each register is data to control whether to transmit an erase pulse. Bit 1 of each register is data to control whether to

TABLE 1

| Register | bit 7 | bit 6 | bit 5 | bit 4 | bit 3 | bit 2 | bit 1 | bit 0 |
|---|---|---|---|---|---|---|---|---|
| Peak SW register | CH_EN | Read_LDO N | First Pulse | Last Pulse | Multi-pulse | Erase Pulse | Cooling Pulse | Bottom Pulse |
| Erase SW register | CH_EN | Read_LDO N | First Pulse | Last Pulse | Multi-pulse | Erase Pulse | Cooling Pulse | Bottom Pulse |
| Cooling SW register | CH_EN | Read_LDO N | First Pulse | Last Pulse | Multi-pulse | Erase Pulse | Cooling Pulse | Bottom Pulse |
| Bottom SW register | CH_EN | Read_LDO N | First Pulse | Last Pulse | Multi-pulse | Erase Pulse | Cooling Pulse | Bottom Pulse |
| Read SW register | CH_EN | Read_LDO N | First Pulse | Last Pulse | Multi-pulse | Erase Pulse | Cooling Pulse | Bottom Pulse |
| Auxiliary SW register | CH_EN | Read_LDO N | First Pulse | Last Pulse | Multi-pulse | Erase Pulse | Cooling Pulse | Bottom Pulse |

As shown in Table 1, the register file 105 of the control unit 101 includes a register which stores 8-bit data for a peak switch (Peak SW), a register which stores 8-bit data for an erase switch (Erase SW), a register which stores 8-bit data for a cooling switch (Cooling SW, also referred to as bias 2 SW), a register which stores 8-bit data for a bottom switch (Bottom SW, also referred to as bias 3 SW), a register which stores 8-bit data for a read switch (Read SW), and a register which stores 8-bit data for an auxiliary switch (Auxiliary SW). Therefore, the peak switch, the erase switch, the cooling switch, the bottom switch, the read switch, and the auxiliary switch can be defined as a peak register, an erase register, a bottom register, a read register, and an auxiliary register, respectively.

The peak switch is a signal to control whether the control signal generating unit 115 is to generate a peak control signal, which is generated to control the pulse type of the peak control signal. The erase switch is a signal to control whether the control signal generating unit 115 is to generate an erase control signal, which is generated to control the pulse type of the erase control signal. The bottom switch is a signal to control whether the control signal generating unit 115 is to generate a bottom control signal, which is generated to control the pulse type of the bottom control signal. The read switch is a signal to control whether the control signal generating unit 115 is to generate a read control signal, which is generated to control the pulse type of the transmit a cooling pulse. Bit 0 of each register is data to control whether to transmit a bottom pulse.

For example, if bits 7 through 3 of a peak switch are set to an activation state, the control signal generating unit 115 generates a peak control signal. The generated peak control signal has a first pulse, a last pulse and a multi-pulse. If the active state (bit 7) is '0,' the peak control signal of the control signal generating unit 115 is disabled so as not to be used.

The main control unit 50 is synchronized to an NRZI being input, and uses information stored in a lead in region of the optical recording medium 170 or other information which enables identification of the type of the received optical recording medium 170. The main control unit 50 analyzes the type of the optical recording medium 170 and a recording speed in the optical drive. Based on the analyzed result, the main control unit 50 provides information to the control unit 101 so that the control unit 101 can recognize the type and recording speed factor of the received optical recording medium 170. The main control unit 50 uses one of existing known methods for analysis of the type and recording speed factor of an optical recording medium 170.

If an NRZI signal is input, The NRZI detection unit 110 detects information on a write mark to be formed on the current optical recording medium 170, information on a combination of the sizes of the write mark and the previous space, and information on a combination of the sizes of the write mark and the following space. The NRZI detection unit 110 sends the detected information to the control signal generating unit 115.

The control signal generating unit 115 generates a control signal to enable the channel of the LD driving unit 150. The control signal varies a rising edge of the first pulse and a falling edge of the last pulse according to data which is stored in the register file 105 and provided from the control unit 101, information on the type and recording speed factor of the received optical recording medium 107, and information on the write mark to be formed and the previous and following spaces.

A control signal to be generated in the shown example is one of at least six control signals. The six control signals are the peak control signal, the erase control signal, the cooling control signal, the bottom control signal, the read control signal, and the auxiliary control signal. Depending on the received optical recording medium 107, the erase control signal may also be referred to as a bias 1 control signal. Depending on the received optical recording medium 107, the cooling control signal may also be referred to as a bias 2 control signal. Depending on the received optical recording medium 107, the bottom control signal may also be referred to as a bias 3 control signal.

Figure 2:
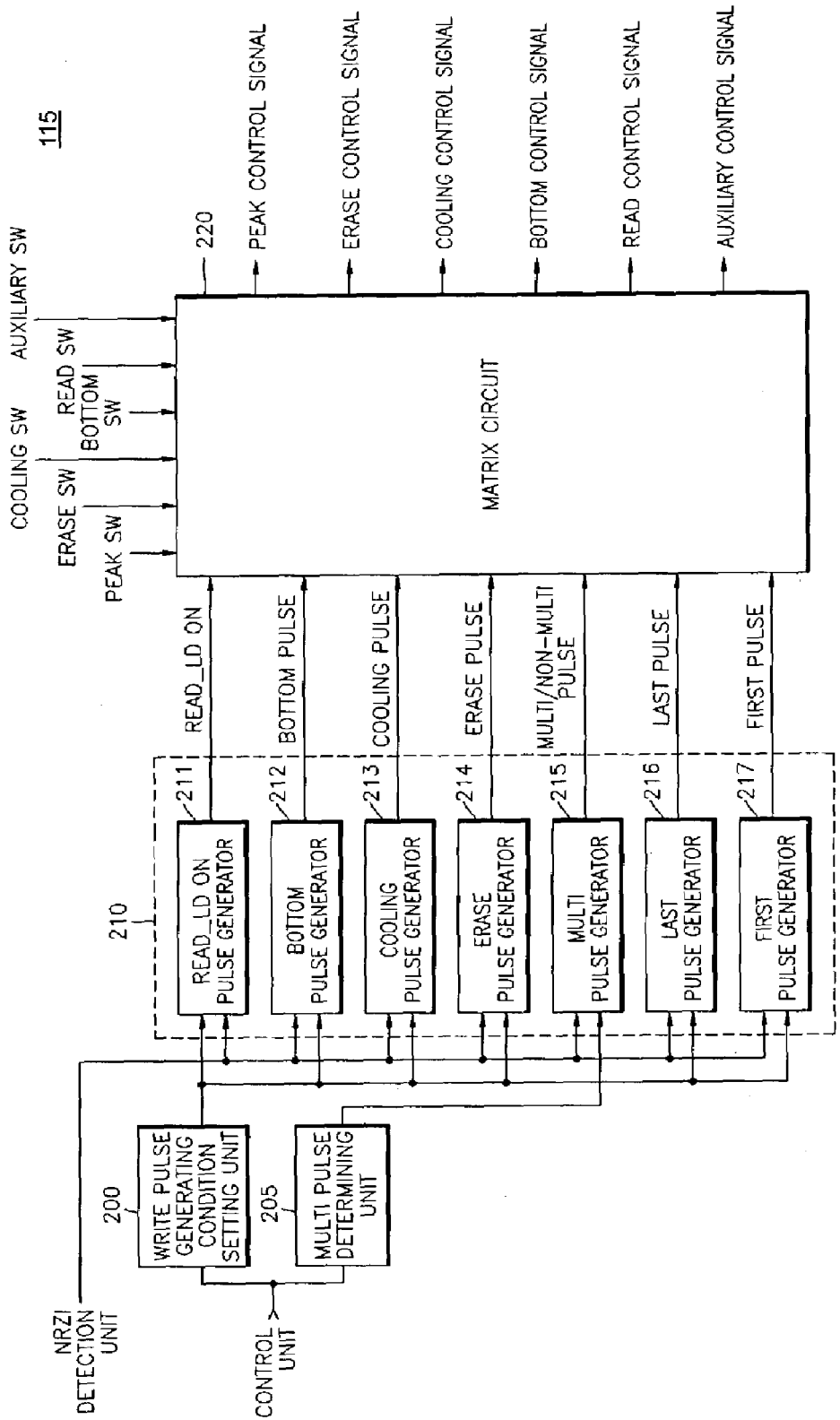
FIG. 2 is a detailed block diagram of a control signal generating unit shown in FIG. 1.

An embodiment of the control signal generating unit 115 is shown in FIG. 2. The control signal generating unit 115 includes a write pulse generating condition setting unit 200, a multi-pulse determining unit 205, a pulse generator group 210, and a matrix circuit 220. The write pulse generating condition setting unit 200 sets the types of pulses and conditions for the rising edges and falling edges of the pulses which are needed to form a write pulse to be generated according to received information on the type and recording speed factor of the received optical recording medium 107 as provided by the control unit 101. The resulting write pulse generating condition information is provided to the pulse generator group 210.

The multi-pulse determining unit 205 determines whether a multi-pulse interval is generated as a non-multi-pulse type or as a multi-pulse type according to information on the type and recording speed factor of the received optical recording medium 107 as provided by the control unit 101. If the non-multi-pulse type is determined, the rising edge (or the start point) and the falling edge (or the end point) of the non-multi-pulse type to be generated are divided into four kinds, and it is determined which kind is to be generated.

Figure 3:
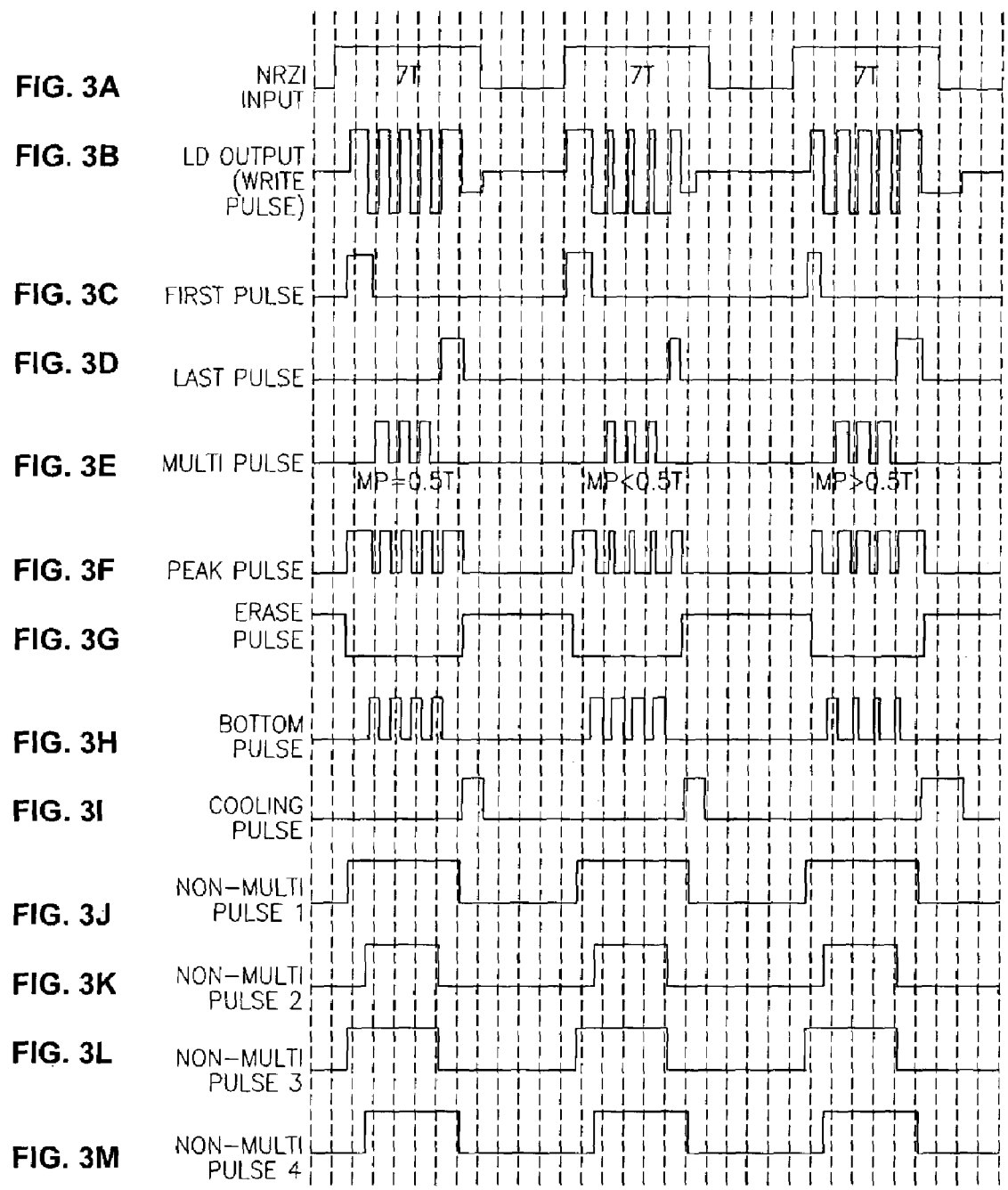
FIGS. 3A through 3M are timing diagrams of pulses generated in the pulse generator group shown in FIG. 2 on the basis of the NRZI input and the LD output.

The four kinds of non-multi-pulse types can be classified as shown in FIGS. 3J through FIG. 3M. That is, when the waveform of a write pulse which is output from the LD 160 is as shown in FIG. 3B, non-multi-pulse types can be divided into a first non-multi-pulse, in which the start point of the multi-pulse is the same as the start point (Tsfp) of the first pulse and the end point of the multi-pulse is the same as the end point (Telp) of the last pulse as shown in FIG. 3J; a second non-multi-pulse in which the start point of the multi-pulse is the same as the end point (Tefp) of the first pulse and the end point of the multi-pulse is the same as the start point (Tslp) of the last pulse as shown in FIG. 3K; a third non-multi-pulse in which the start point of the multi-pulse is the same as the start point (Tsfp) of the first pulse and the end point of the multi-pulse is the same as the start point (Tslp) of the last pulse as shown in FIG. 3L; and a fourth non-multi-pulse in which the start point of the multi-pulse is the same as the end point (Tefp) of the first pulse and the end point of the non-multi-pulse is the same as the end point (Telp) of the last pulse as shown in FIG. 3M. The multi-pulse determining unit 205 determines one of the 4 non-multi-pulse types as the one corresponding to the received optical recording medium 107.

Also, the multi-pulse determining unit 205 can determine whether to generate an on-start multi-pulse, which begins at a "high" logic level in a channel clock, or to generate an off-start multi-pulse, which begins at a "low" logic level in a channel clock.

Information determined in the multi-pulse determining unit 205 is also provided to the pulse generator group 210. The pulse generator group 210 independently generates pulses needed to form the write pulse based on write pulse generating condition information provided from the write pulse generating condition setting unit 200, the multi-pulse generating condition information provided by the multi-pulse determining unit 205, and information on a write mark to be formed at the present, the previous, and the following spaces provided by the NRZI detection unit 110.

For this, the pulse generator group 210 includes a read LD on (Read_LD ON) pulse generator 211, a bottom pulse generator 212, a cooling pulse generator 213, an erase pulse generator 214, a multi-pulse generator 215, a last pulse generator 216, and a first pulse generator 217. According to the condition information which is provided by the write pulse generating condition setting unit 200 and information provided by the NRZI detection unit 110, each pulse generator 211, 212, 213, 214, 215, 216 and 217 determines the starting point (start location) and the ending point (end location) of the corresponding pulse, and generates a pulse.

Specifically, as shown in FIGS. 3A through 3M, if the input NRZI signal is as shown in FIG. 3A, and the write pulse generated in the LD 160 is as shown in FIG. 3B, the Read_LD ON pulse generator 211 generates a pulse which is continuously in a "high" logic state. The bottom pulse generator 212 generates a pulse as shown in FIG. 3H. The cooling pulse generator 213 generates a pulse as shown in FIG. 3I. The erase pulse generator 214 generates a pulse as shown in FIG. 3G.

The multi-pulse generator 215 generates a multi-pulse train as shown in FIG. 3E and one of non-multi-pulses shown in FIGS. 3J through 3M according to the determined result provided by the multi-pulse determining unit 205. For a multi-pulse width (MP), three states of MP=0.5Tw, MP<0.5Tw, and MP>0.5Tw may be selected as shown in FIG. 3E, or one or two states may selected at the same time.

The last pulse generator 216 generates a pulse as shown in FIG. 3D according to the generating condition provided by the write pulse generating condition setting unit 200. Also, the first pulse generator 217 generates a pulse as shown in FIG. 3C according to the generating condition provided by the write pulse generating condition setting unit 200. The width of the last pulse and the width of the first pulse may be variably set in the write pulse generating condition setting unit 200 according to the type and recording speed factor of an optical recording medium.

The peak pulse shown in FIG. 3F is formed by a combination of pulses shown in FIGS. 3C, 3D and 3E generated by the first pulse generator 217, the last pulse generator 216, and the multi-pulse generator 125, and the peak control signal, which is output from the matrix circuit 220 as explained below. The matrix circuit 220 independently determines whether to send the pulses which are generated in the pulse generator group 210 by the peak switch register, the erase switch register, the cooling switch register, the bottom switch register, the read switch register, and the auxiliary switch register provided from the control unit 101. The matrix circuit 220 sends a control signal to the driving unit 150. The control signal is formed by a combination of pulses according to the determined result. Control signals which can be output from the matrix circuit 208 are the peak control signal, the erase control signal, the cooling control signal, the bottom control signal, the read control signal, and the auxiliary control signal.

Figure 4:
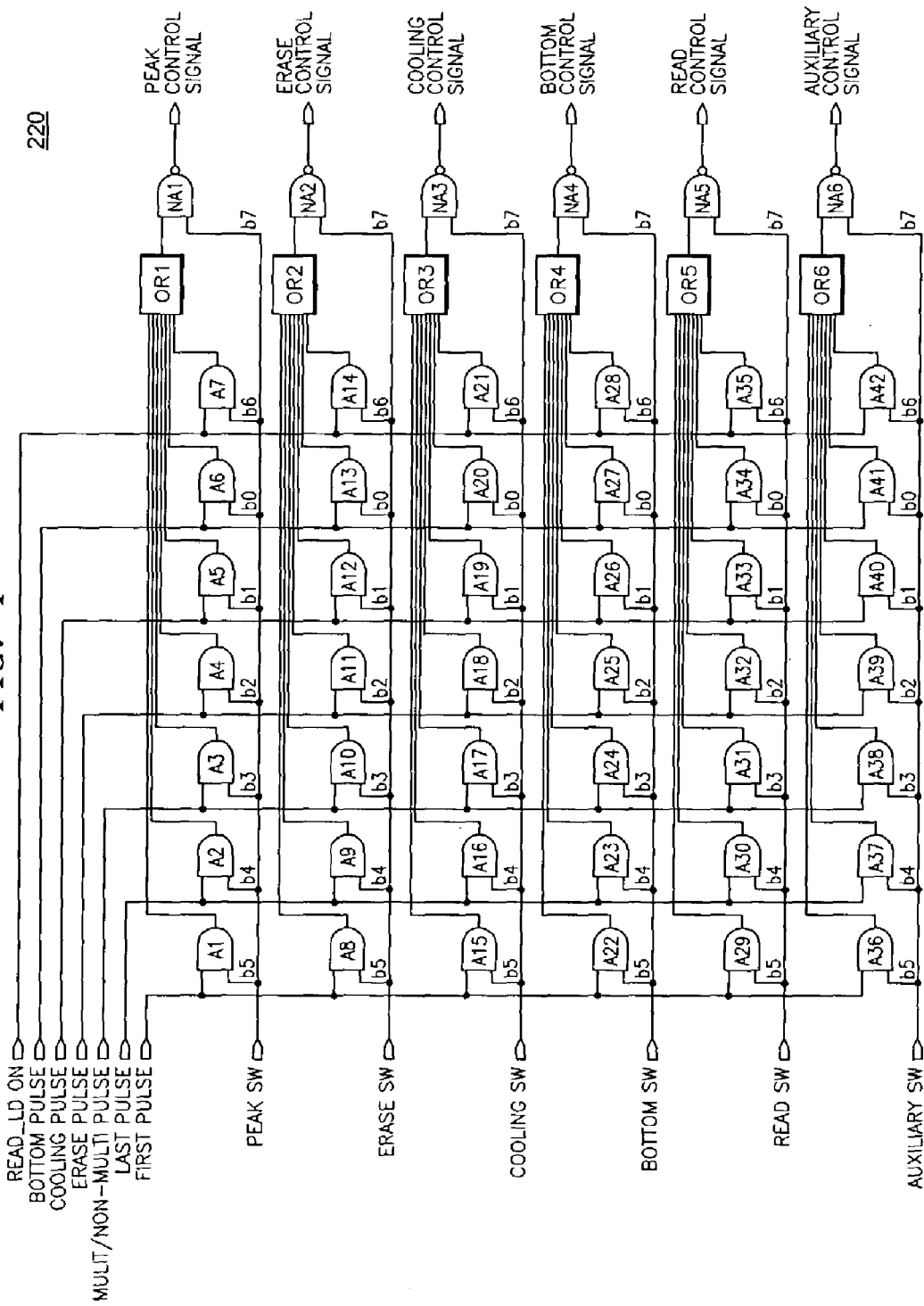
FIG. 4 is an example circuit diagram of a matrix circuit shown in FIG. 2.

An embodiment of the matrix circuit 208 is shown in FIG. 4. The matrix circuit has AND gates (A1 through A42) having a 6×7 matrix structure and OR gates (OR1 through OR6). Each of the OR gates OR1 through OR6 performs an OR operation on the outputs of AND gates (A1 through A7, A8 through A14, A15 through A21, A22 through A28, A29 through A35, or A36 through A42) of each switch control signal unit which is sent from the control unit 101. NAND gates (NA1 through NA6) perform NAND operations on the most significant bit (bit 7) of the corresponding switch control signal and the output of the corresponding OR gates OR1 through OR6.

A pulse generated from the Read_LD ON pulse generator 211 is input to the AND gates (A7, A14, A21, A28, A35, and A42) to which is input the bit 6 data of the corresponding register 105 included in the control unit 101. Accordingly, if the bit 6 of the corresponding register 105 is '0,' a pulse generated from the Read_LD ON pulse generator 211 is sent to the corresponding OR gates (OR1 through OR6).

A pulse generated in the bottom pulse generator 212 is input to the AND gates (A6, A13, A20, A27, A34, and A41) to which is input the bit 0 data of the corresponding register 105 included in the control unit 101. Accordingly, if the bit 0 of the corresponding register 105 is '0,' a pulse generated from the bottom pulse generator 211 is sent to the corresponding OR gate (OR1 through OR6).

A pulse generated in the cooling pulse generator 213 is input to the AND gates (A5, A12, A19, A26, A33, and A40) to which is input the bit 1 data of the corresponding register 105 included in the control unit 101. Accordingly, if the bit 1 of the corresponding register 105 is '0,' a pulse generated from the cooling pulse generator 213 is sent to the corresponding OR gates (OR1 through OR6).

A pulse generated in the erase pulse generator 214 is input to the AND gates (A4, A11, A18, A25, A32, and A39) to which is input the bit 2 data of the corresponding register 105 included in the control unit 101. Accordingly, if the bit 2 of the corresponding register 105 is '1,' a pulse generated from the erase pulse generator 214 is sent to the corresponding OR gates (OR1 through OR6).

A multi-pulse or non-multi-pulse generated from the multi-pulse generator 215 is input to the AND gates (A3, A10, A17, A24, A31, and A38) to which is input the bit 3 data of the corresponding register 105 included in the control unit 101. Accordingly, if the bit 3 of the corresponding register 105 is '1,' a pulse generated from the multi-pulse generator 215 is sent to the corresponding OR gates (OR1 through OR6).

A pulse generated from the last pulse generator 216 is input to the AND gates (A2, A9, A16, A23, A30, and A37) to which is input the bit 4 data of the corresponding register 105 included in the control unit 101. Accordingly, if the bit 4 of the corresponding register 105 of the control unit 101 is '1,' a pulse generated from the last pulse generator 216 is sent to the corresponding OR gates (OR1 through OR6).

A pulse generated from the first pulse generator 217 is input to the AND gates (A1, A8, A15, A22, A29, and A36) to which is input the bit 5 data of the corresponding register 105 included in the control unit 101. Accordingly, if the bit 5 of the corresponding register 105 is '1,' a pulse generated from the first pulse generator 217 is sent to the corresponding OR gated (OR1 through OR6).

A signal which is input from the control unit 101 to the AND gates (A1 through A7) of a first row is bit data stored in the peak switch register. A signal which is input to the AND gates (A8 through A14) of a second row is bit data stored in the erase switch register. A signal which is input to the AND gates (A15 through A21) of a third row is bit data stored in the cooling switch register. A signal which is input to the AND gates (A22 through A28) of a fourth row is bit data stored in the bottom switch register. A signal which is input to the AND gates (A29 through A35) of a fifth row is bit data stored in the read switch register, and a signal which is input to AND gates (A36 through A42) of the sixth row is bit data stored in the auxiliary switch register.

NAND device NA1 performs a NAND operation on the most significant bit (bit 7) of the peak switch register and the output of the OR gate OR1, and outputs the result as a peak control signal. NAND gate NA2 performs a NAND operation on the most significant bit (bit 7) of the erase switch register and the output of the OR gate OR2, and outputs the result as an erase control signal. NAND device NA3 performs a NAND operation on the most significant bit (bit 7) of the cooling switch register and the output of the OR gate OR3, and outputs the result as a cooling control signal. NAND gate NA4 performs a NAND operation on the most significant bit (bit 7) of the bottom switch register and the output of the OR gate OR4, and outputs the result as a bottom control signal. NAND gate NA5 performs a NAND operation on the most the result as a read control signal. NAND gate NA6 performs a NAND operation on the most significant bit (bit 7) of the auxiliary switch register and the output of the OR gate OR6, and outputs the result as an auxiliary control signal.

It is understood that, according to the conditions of the bit data provided by the control unit 101, the logic circuit used in the matrix circuit 208 can be changed or formed with other logic gates or analog switches performing the same functions. The size of the matrix can be adjusted to be appropriate to a system which is desired to be created and is not limited to the matrix shown by way of example.

The current providing unit 120 shown in FIG. 1 includes a Variable Gain Amplifier (VGA) 121, first through fifth Sample & Holds (S/H) 122_1 through 122_5, first through fifth transmitting units 123 through 127, and first through fifth Digital-to-Analog Converters (DAC) 128 through 132. The current providing unit 120 performs the same basic role as in the Automatic Power Control (APC) block of the conventional optical drives and a detailed description of the same is therefore omitted. Accordingly, it is possible to form the current providing unit 120 as a voltage providing unit which provides voltage to the LD driving unit 150.

The VGA 121 amplifies a current signal generated from the photo diode 140 to a predetermined gain, and converts the signal into a voltage signal. Each of the first through the fifth S/H 122_1 through 122_5 samples and holds the output signal of the VGA 121 for an interval specified by the control signal, and transmits the sampled signal to the corresponding transmitting units 123 through 127. The control signal is provided by the control unit 101. For example, the first S/H 122_1 samples and holds the signal which is output from the VGA 121 during the read interval specified by the control signal, and sends the sampled signal to the first transmitting unit 123. The second S/H 122_2 samples and holds the signal which is output from the VGA 121 during the peak level (first level+multi level+last level) interval specified by the control signal, and sends the sampled signal to the second transmitting unit 124. The third S/H 122_3 samples and holds the signal which is output from the VGA 121 during the erase interval specified by the control signal, and sends the sampled signal to the third transmitting unit 125. The fourth S/H 122_4 samples and holds the signal which is output from the VGA 121 during the cooling interval specified by the control signal, and sends the sampled signal to the fourth transmitting unit 126. The fifth S/H 122_5 samples and holds the signal which is output from the VGA 121 during the bottom interval specified by the control signal, and sends the sampled signal to the fifth transmitting unit 127.

The enable state of each of the first through fifth transmitting units 123 through 127 is controlled by the control signal provided by the control unit 101. Each of the first through fifth transmitting units 123 through 127 outputs digital data of a current for a channel to control the output power of the LD 150 according to the signal output from the first through fifth S/H 122_1 through 122_5.

In addition, it is understood that the first through the fifth transmitting units 123 through 127 can be adjusted to be appropriate for a system which is desired to be built. Also, an S/H and a transmitting unit can be sequentially used for each of needed channels.

The first through the fifth transmitting units 123 through 127 can be up/down counters (not shown), multiplexers (not shown), and filtering units (not shown). Assuming that the first through fifth transmitting units 123 through 127 are formed as described above, if a signal output from a corresponding S/H is compared with a reference signal, and the S/H signal is found to be greater than the reference signal, the up/down counter (not shown) performs downcounting and the resulting value is output as digital data of a current for each channel for controlling output power. The output signal is sent to DACs 128 through 132. If the S/H signal is less than the reference signal, the up/down counter (not shown) performs upcounting and the resulting value is output as digital data of a current for each channel for controlling output power. The output signal is sent to DACs 128 through 132. Controlled by the control unit 101, the multiplexer (not shown) selects one of the downcounted result and a voltage amplified in the VGA 121 and sends the selected one to an ADC (not shown) and then to the filtering unit (not shown). The filtering unit (not shown) filters the signal output from the multiplexer (not shown) so as to make the signal have a desired value, and outputs the filtered signal.

The first through the fifth DAC 128 through 132 convert the values sent by the first through the fifth transmitting units 123 through 127 into analog signals (signals having a current value), and send the analog signals to the LD driving unit 150. The signal output from the first DAC 128 is a read current. The signal output from the second DAC 129 is a peak current. The signal output from the third DAC 130 is an erase current. The signal output from the fourth DAC 131 is a cooling current. The signal output from the fifth DAC 132 is a bottom current. If the current providing unit 120 is implemented as a voltage providing unit, the signals output from the first through the fifth DACs 128 through 132 have a voltage value.

Also, a current providing unit connects resistors R1 and R2 to a channel in which the erase current is sent so that the voltage of the channel from which the erase current is output is divided. Then, the contact point (A) between the resistors R1 and R2 is connected to the LD driving unit 150 so that the auxiliary current is input to the LD driving unit 150. Accordingly, without an additional and separate calculating unit or a DAC, the number of currents for automatic power control of the LD 160 increases by 1. As described above, by connecting a mechanism which divides the voltage to a desired channel and the LD driving unit 150, the number of currents used to provide automatic power control of the LD 160 can be increased. For example, while not shown, the voltage dividing unit can be connected to the channel from which the read current is output.

The photo diode 140 is a mechanism which receives light that is reflected from the optical recording medium 170.

According to the control signal provided by the control signal generating unit 115, the LD driving unit 150 selects a corresponding current among the currents provided by the current providing unit 120, adds and amplifies the selected current, and then provides the amplified current to the LD 160. Accordingly, the LD 160 emits light corresponding to a write pulse having a desired level, to the optical recording medium 170. Thus, according to the type and recording speed factor of the received optical recording medium 170 which is used at present, the level of the write pulse of the entire interval or a partial interval of the write mark can be increased, decreased, or maintained. Also, in the entire interval or a partial interval for a multi-pulse and erase interval (write space interval), the level of the write pulse can be adjusted so as to be increased, decreased, or maintained.

Figure 5:
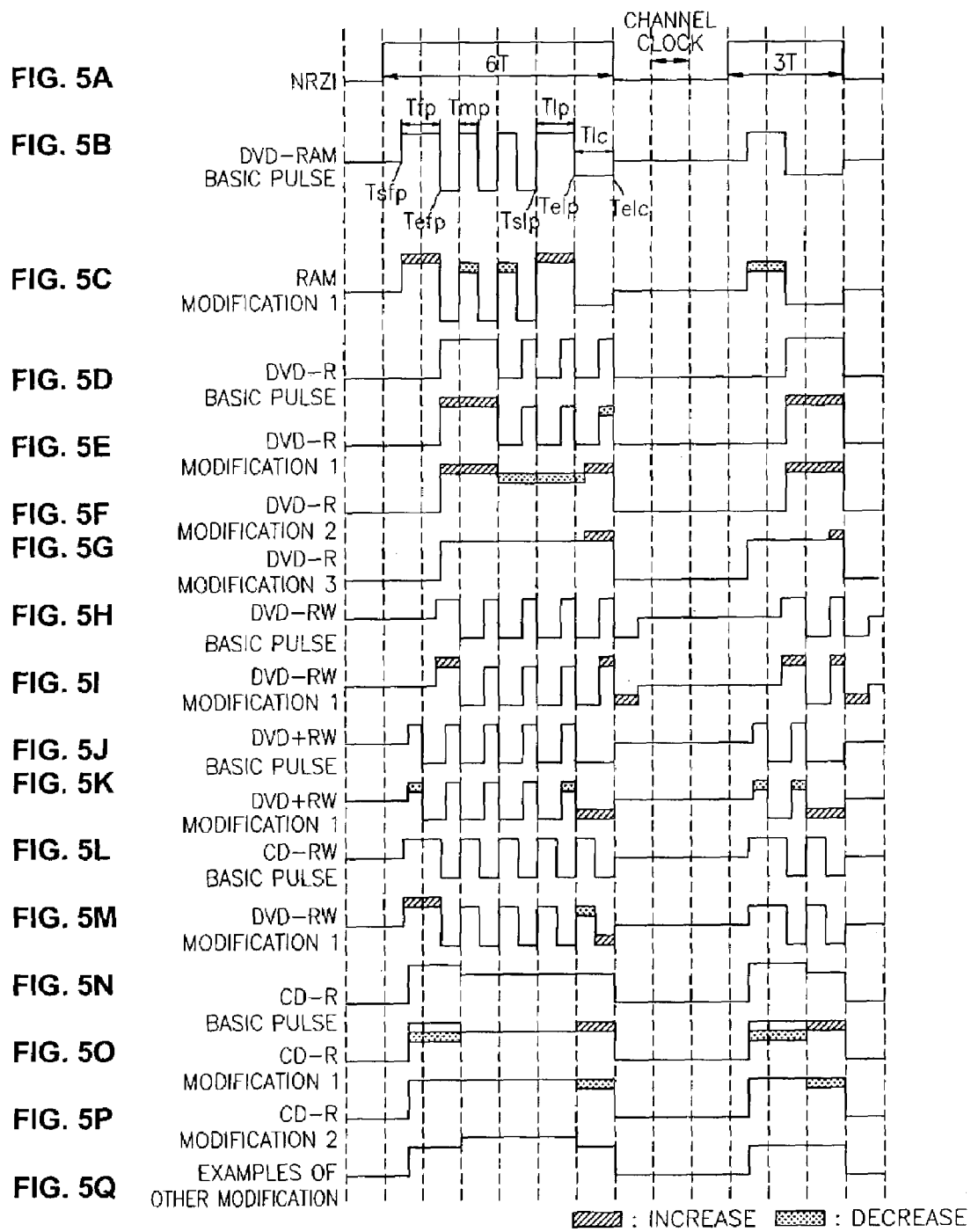
FIGS. 5A through 5Q are timing diagrams of modified write pulse levels for each optical recording media according to the present invention.

FIGS. 5A through 5Q show examples of modified levels of the write pulse for each of optical recording media according to the present invention. The number of combinations of write pulses that can be generated is determined by the size of the matrix circuit 220. Thus, the size of the matrix circuit 220 is determined by the number of combinations of write pulses that are desired to be generated. Therefore, the matrix circuit 220 can be changed according to the number of combinations of write pulses that are desired to be generated.

When an NRZI signal is input as shown in FIG. 5A, a basic write pulse of the DVD-RAM is generated in the LD 160 is as shown in FIG. 5B. However, according to the present invention, in the write pulse of the DVD-RAM, the intervals of the peak pulse, the multi-pulse, and the last pulse can be increased by a predetermined level as shown in FIG. 5C. That is, the write pulse levels of the peak pulse interval and the last pulse intervals can be increased, while the write pulse level of the multi-pulse train can be decreased.

Also, the basic write pulse of the DVD-R is as shown in FIG. 5D. According to the present invention, the write pulse of the DVD-R can be modified such that the write pulse level of the peak pulse interval is increased, the write pulse level of the last pulse interval is decreased, and the write pulse level of the multi-pulse train interval is maintained as shown in FIG. 5E. Otherwise, the write pulse can be modified such that, as shown in FIG. 5F, the intervals of the peak pulse and the last pulse are increased, and the multi-pulse interval is generated in a non-multi-pulse shape and is decreased by a predetermined level. Also, the write pulse can be modified such that, as shown in FIG. 5G, the multi-pulse interval is controlled to be generated in a non-multi-pulse shape, and only the last pulse interval is increased by a predetermined level.

The basic write pulse of the DVD-RW is as shown in FIG. 5H. According to the present invention, the write pulse can be modified such that, as shown in FIG. 5I, the intervals of the first pulse, the last pulse, and the cooling pulse are increased by a predetermined level, respectively.

When the basic write pulse of the DVD+RW is as shown in FIG. 5J, according to the present invention, the write pulse can be modified such that, as shown in FIG. 5K, the intervals of the first pulse and the last pulse are decreased by a predetermined level, and the interval of the cooling pulse is increased.

When the basic write pulse of the CD-RW is as shown in FIG. 5L, according to the present invention, the write pulse can be modified such that, as shown in FIG. 5M, the interval of the first pulse is increased by a predetermined level, the interval of the last pulse is decreased by a predetermined level, and the interval of the cooling pulse is increased by a predetermined level.

When the basic write pulse of the CD-RW is as shown in FIG. 5N, according to the present invention, the write pulse can be modified such that the write pulse level of the first pulse interval is decreased and the write pulse level of the last pulse interval is increased as shown in FIG. 5O. Otherwise, the write pulse can be modified such that the write pulse level of the last pulse interval is decreased and the write pulse level of other intervals is maintained as shown in FIG. 5P.

Also, other modifications as shown in FIG. 5Q are possible. The modification of FIG. 5Q can be obtained by decreasing the write pulse levels of the first pulse interval and the last pulse interval and generating the multi-pulse interval in a non-multi-pulse shape, or by generating the write pulse such that only the write pulse level of the multi-pulse interval having a non-multi-pulse shape is increased.

FIGS. 5A through 5Q show examples in which the amount of increase or decrease is regular. However, the amount of increase or decrease of a write pulse level can be variably controlled by adjusting the pulse type and the number of the control signals generated from the control signal generating unit 115, and increasing the number of currents input to the LD driving unit 150 by using the voltage dividing unit.

Figure 6:
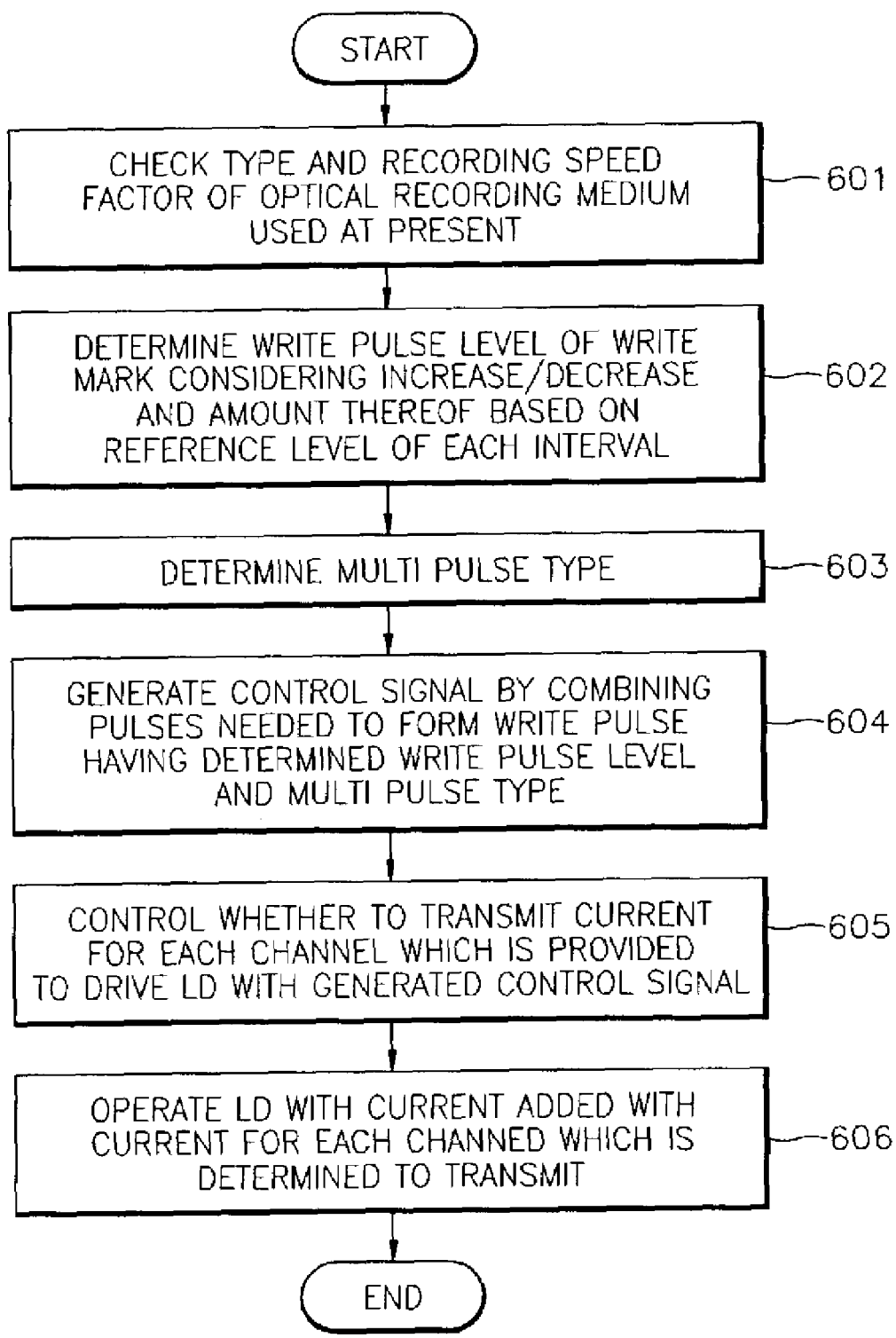
FIG. 6 is a flowchart showing a write pulse generating method appropriate for a variety of optical recording media according to another embodiment of the present invention.

FIG. 6 is a flowchart showing a write pulse generating method appropriate for a variety of optical recording media according to an embodiment of the present invention. The type and recording speed factor of the received optical recording medium which is used at present is identified (operation 601). For this, a conventional method can be used. In operation 602, the write pulse level of a write mark desired to be marked on the received optical recording medium is determined. At this time, as described above in relation to the control unit 101, the level of the write pulse is determined considering whether the write pulse level is increased or decreased, and the amount of the increase or decrease based on the reference level of each interval of the write mark. Based on the determined write pulse level, the value of the register file 105 is set. The value set in the register file 105 corresponds to the combination condition of the pulses which will be explained in detailed below.

Figure 7:
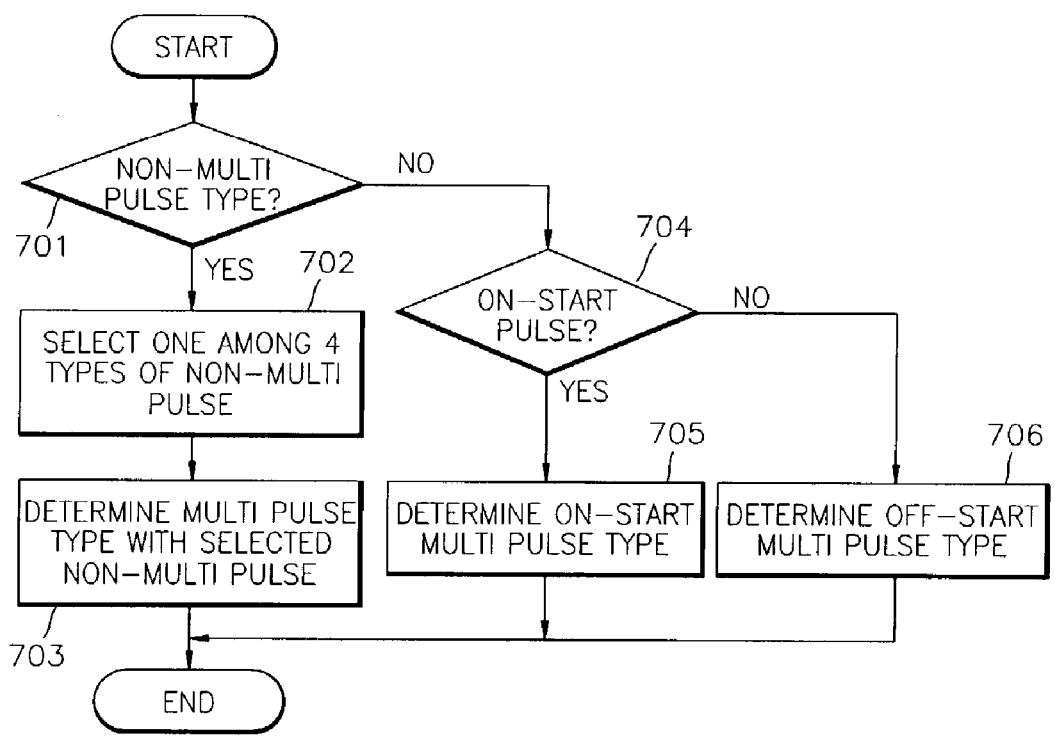
FIG. 7 is a detailed flowchart of an operation to determine a multi-pulse type.

In operation 603, the type of the multi-pulse is determined. The type of the multi-pulse is determined as shown in FIG. 7. In operation 701, it is determined whether the multi-pulse interval is generated as a non-multi-pulse. This determination is determined by the type and recording speed factor of the received optical recording medium. If it is determined in operation 701 that the multi-pulse interval is to be generated as a non-multi-pulse according to the type and speed factor of the optical recording medium, one of four kinds of non-multi-pulses is selected according to the type and speed factor of the optical recording medium (operation 702). The four kinds of non-multi-pulse types are the same as explained above in relation to the multi-pulse determining unit 205 of FIG. 2.

If one of the four kinds of non-multi-pulses is selected in operation 702, the pulse type of the multi-pulse interval is determined as the selected non-multi-pulse in operation 703.

However, if it is determined in operation 701 that the multi-pulse interval is not a non-multi-pulse, it is determined whether the multi-pulse interval is an on-start multi-pulse type (operation 704). If it is determined that the multi-pulse interval is an on-start multi-pulse type, the pulse type of the multi-pulse interval is determined as an on-start multi-pulse type (operation 705). At this time, the width of the multi-pulse can be variably set according to the kind, recording speed factor, and write mark size of the received optical recording medium. However, if it is determined in operation 704 that the multi-pulse interval is not an on-start multi-pulse type, the pulse type of the multi-pulse interval is determined as an off-start multi-pulse type (operation 706). At this time, the width of the multi-pulse can be variably set according to the kind, recording speed factor, and write mark size of the received optical recording medium.

Referring to FIG. 6, in operation 604, by combining the necessary pulses to form a write pulse having the write pulse level determined in operation 602 and the multi-pulse type determined in operation 603, a control signal is generated to control the LD driving unit 150. At this time, the pulses are combined according to the values set in the register file 105. According to the generated control signal, it is controlled whether or not to transmit a current for each channel which is provided to drive the LD (operation 604). With a current added by the current for each channel which is determined to be transmitted, the LD 160 is driven (operation 605).

According to the present invention described above, by generating a write pulse appropriate for a variety of optical recording media and recording speed factors in an optical drive, compatibility with various types of optical recording media and various recording speed factors is improved so that a quality recording can be accomplished onto any optical recording medium and any recording speed factor. Also, since a multi-pulse interval can be controlled to be generated as one of a plurality of non-multi-pulses, on-start multi-pulses, and off-start multi-pulses according to the type and recording speed factor of an optical recording medium, more diversified write pulses can be provided and even later added for later-developed media. In addition, since it is easy to increase or decrease the level of a write pulse and any required write pulse can be generated, one optical drive can be compatible with a wider range of optical recording media. Also, by increasing the number of currents for automatic power control provided to the LD driving unit without adding a separate hardware channel path, the scope of write pulse levels that can be increased can be extended.

While embodiments of the invention have been explained above and are shown by way of example, the present invention is not restricted to the above-described embodiments and many variations are possible within the spirit and scope of the present invention. The scope of the present invention is not determined or limited by the above description, but instead is defined the accompanying claims and equivalents thereof.

What is claimed is:

1. A write pulse generating apparatus which generates a write pulse appropriate to an optical recording medium by controlling a light emitting device using a light emitting device driving unit so that a desired write pulse is generated, the write pulse generating apparatus comprising:

a control unit which determines and provides type information regarding a type of the optical recording medium and speed information regarding a recording speed factor; and a control signal generating unit which determines a type of a multi-pulse to be generated in a multi-pulse interval based on the type and speed information for the optical recording medium provided by the control unit, and generates a control signal to control the light emitting device driving unit to generate a write pulse having the determined multi-pulse type, wherein the control signal generating unit selects and determines the type of the multi-pulse to be generated in the multi-pulse interval as one of a plurality of non-multi-pulse types and a plurality of multi-pulse train types.

2. The apparatus of claim 1, wherein:

the plurality of non-multi-pulse types are distinguished using:

a rising edge and a falling edge of a first pulse included in the write pulse, and a rising edge and a falling edge of a last pulse included in the write pulse, and the plurality of multi-pulse trains are distinguished according to whether the multi-pulse train starts at a "high" logic level in a channel clock.

3. The apparatus of claim 2, wherein widths of the first pulse and the last pulse are variably set according to the type and/or the recording speed factor of the optical recording medium.

4. The apparatus of claim 1, wherein the control signal generating unit generates and transmits a control signal to the light emitting device driving unit in order to change the entire level or a partial level of the multi-pulse interval of the write pulse generated from the light emitting device.

5. A write pulse generating apparatus which generates a write pulse appropriate for an optical recording medium by controlling a light emitting device driving unit, the apparatus comprising:

a control unit which sets a level of the write pulse for up to an entire interval of a write mark and/or a write space to be written on the optical recording medium according to a type and recording speed factor of the optical recording medium; and a control signal generating unit controlled by the control unit and which generates a control signal for use in changing the level of the write pulse for each interval of the write mark and/or the write space, and sends the control signal to the light emitting device driving unit, wherein the control unit sets:

a first level of the write pulse of a first partial interval of the write mark to be one of a level increased from the reference level of the first partial interval, a level decreased from the reference level of the first partial interval, and a level maintained at the reference level of the first partial interval, sets a second level of the write pulse of a second partial interval of the write mark to be one of a level increased from the reference level of the second partial interval, a level decreased from the reference level of the second partial interval, and a level maintained at the reference level of the second partial interval, and sets a third level of the write pulse of a third partial interval of the write mark to be one of a level increased from the reference level of the third partial interval, a level decreased from the reference level of the third partial interval, and a level maintained at the reference level of the third partial interval.

6. The apparatus of claim 5, wherein each interval comprises partial intervals, and the control unit sets the level of the write pulse such that the level of the write pulse increases or decreases from a set reference level for each of the partial intervals.

7. The apparatus of claim 5, wherein each interval comprises partial intervals, and the control unit sets the write pulse level of at least one of the partial intervals among a plurality of partial intervals in the write mark such that the write pulse level one of increases from a corresponding reference level and decreases from the corresponding reference level.

8. A write pulse generating apparatus which generates a write pulse appropriate for an optical recording medium, the apparatus comprising:

a light emitting device which emits light corresponding to the write pulse to be received by the optical recording medium;

a driving unit which drives the light emitting device such that the write pulse is generated as a type which is determined according to a type and recording speed factor of the optical recording medium;

a light receiving unit which receives light reflected from the optical recording medium;

a power control signal providing unit which provides a power control signal for use in controlling power for each one of a plurality of channels to the driving unit using an output signal from the light receiving unit and a predetermined reference voltage in order to automatically control power needed in the light emitting device;

a control signal generating unit which generates a signal for controlling whether to send the power control signal for each of the channels and which is input to the driving unit such that a level of the write pulse is variably adjusted up to an entire interval of a write mark and/or a write space to be formed on the optical recording medium according to a type and recording speed factor of the optical recording medium, and sends the generated signal to the driving unit; and a control unit which controls whether to generate a control signal in the control signal generating unit and a pulse type of the control signal according to the type and recording speed factor of the optical recording medium, wherein the power control signal providing unit comprises a voltage divider which divides voltage and is connected to at least one channel such that a power control signal output from the voltage divider is provided as an auxiliary power control signal of the driving unit and there is an increase in a number of the power control signals used for automatic power control of the light emitting device.

9. The apparatus of claim 8, wherein the control signal generating unit comprises:

a write pulse generating condition setting unit which sets generating conditions of the write pulse according to information on the type and recording speed factor of the optical recording medium which is provided by the control unit;

a multi-pulse determining unit which determines a pulse type of a multi-pulse interval according to the information on the type and recording speed factor of the optical recording medium which is provided by the control unit;

a pulse generator group which independently generates pulses needed to form the write pulse based on signals output from the write pulse generating condition setting unit and the multi-pulse determining unit, respectively, first information on the current write mark, and second information on the previous space mark and the following space mark of the current write mark; and a control signal generating circuit which is controlled by the control unit and selects the needed pulses in the pulses generated by the pulse generator group, and forms and generates the control signal.

10. The apparatus of claim 9, wherein the pulse generator group comprises:

a first pulse generator which generates a read laser diode on (Read_LD ON) pulse whose start point and end point are determined according to the first information, the second information, and the signal output from the write pulse generating condition setting unit;

a second pulse generator which generates a bottom (bias 3) pulse whose start point and end point are determined according to the first information, the second information, and the signal output from the write pulse generating condition setting unit;

a third pulse generator which generates a cooling (bias 2) pulse whose start point and end point are determined according to the first information, the second information, and the signal output from the write pulse generating condition setting unit;

a fourth pulse generator which generates an erase (bias 1) pulse whose start point and end point are determined according to the first information, the second information, and the signal output from the write pulse generating condition setting unit;

a fifth pulse generator which generates one of a multi-pulse train and a non-multi-pulse type, each whose start point and end point are determined according to the first information, the second information, and the signal output from the multi-pulse determining unit;

a sixth pulse generator which generates a last pulse whose start point and end point are determined according to the first information, the second information, and the signal output from the write pulse generating condition setting unit; and a seventh pulse generator which generates a first pulse whose start point and end point are determined according to the first information, the second information, and the signal output from the write pulse generating condition setting unit.

11. The apparatus of claim 10, wherein the control signal generating circuit comprises:

a matrix circuit which independently determines whether to send pulses generated from the first through the seventh pulse generators according to the control signal provided by the control unit in order to change the level of the write pulse so that the level of the write pulse in the entire interval or in each partial interval of the write mark and/or write space increases from a reference level of each corresponding interval, and generates and transmits at least one control signal obtained by the determined result to the driving unit.

12. The apparatus of claim 11, wherein the control signal provided by the control unit is formed with bit information which is updated whenever the type and recording speed factor of the optical recording medium change and which is stored in a peak register, an erase register, a cooling register, a bottom register, a read register, and an auxiliary register; the control unit includes a register file storing the bit information in each register unit; and the matrix circuit provides the driving unit with a plurality of control signals obtained by combining the pulses generated in the pulse generator group such that the level of the write pulse of the entire interval or the partial interval of the write mark increases or decreases by the same amount as the amount of the power control signal, which is sent through a predetermined channel, by the control signal provided by the control unit.

13. The apparatus of claim 11, wherein the matrix circuit is capable of outputting a peak control signal, an erase (bias 1) control signal, a cooling (bias 2) control signal, a bottom (bias 3) control signal, a read control signal, and an auxiliary control signal.

14. The apparatus of claim 9, wherein the multi-pulse determining unit variably determines:

a start point and an end point of the non-multi-pulse using a rising edge and a falling edge of a first pulse to be included in the write pulse, and a rising edge and a falling edge of a last pulse to be included in the write pulse according to the type and recording speed factor of the optical recording medium.

15. A write pulse generating method which generates a write pulse appropriate for an optical recording medium using a light emitting device, the method comprising:

determining a pulse type of a multi-pulse interval included in the write pulse generated from the light emitting device according to a type and recording speed factor of the optical recording medium;

generating a control signal which controls whether to send a power control signal provided for each of a plurality of channels in order to drive the light emitting device such that the write pulse having the determined pulse type is emitted from the light emitting device; and driving the light emitting device with the power control signal which is sent through a selected one of the channels selected by the control signal, wherein the determining the pulse type of the multi-pulse interval comprises selecting and determining one of a plurality of non-multi-pulse types and a plurality of multi-pulse trains.

16. The method of claim 15, wherein the signal which controls whether to send the power control signal is generated such that a level of the write pulse of up to an entire interval of the multi-pulse interval is variably set according to the type and recording speed factor of the optical recording medium.

17. A write pulse generating method which generates a write pulse appropriate for an optical recording medium using a light emitting device, the method comprising:

determining the write pulse level of up to an entire interval of a write mark and/or a write space to be formed on the optical recording medium according to a type and recording speed factor of the optical recording medium;

generating a control signal for controlling whether to send a power control signal provided for each of a plurality of channels in order to drive the light emitting device such that light having the determined write pulse level of the write pulse is emitted from the light emitting device; and driving the light emitting device with the power control signal which is provided through a channel selected by the control signal, wherein the generating the control signal comprises determining a condition of a combination of pulses needed to form the write pulse according to the determined write pulse level of the write pulse, and obtaining at least one signal by combining the pulses generated according to the determined combination condition so as to generate the control signal.

18. The method of claim 17, wherein the generating the control signal comprises:
determining the combination condition so that the needed pulses are selected from among a read laser diode on (Read_LD ON) pulse, a bottom (bias 3) pulse, a cooling (bias 2) pulse, an erase (bias 1) pulse, a plurality of multi-pulses, a plurality of non-multi-pulses, a last pulse, and a first pulse; and
generating as the control signal at least one of a peak control signal, an erase (bias 1) control signal, a cooling (bias 2) control signal, a bottom (bias 3) control signal, a read control signal, and an auxiliary control signal.

19. The method of claim 17, wherein the determining the write pulse level comprises considering whether the level of the write pulse increases or decreases based on a reference level of each interval in the write pulse, and an amount of the increase or the decrease.

20. The method of claim 17, further comprising:
determining the pulse type of a multi-pulse interval included in the write pulse according to the type and the recording speed of the optical recording medium.

21. The method of claim 20, wherein the determining the type of the multi-pulse comprises:
determining whether the pulse type of the multi-pulse interval is a non-multi-pulse type according to the type and recording speed factor of the optical recording medium;
determining whether the pulse type is an on-start multi-pulse type if the pulse type of the multi-pulse interval is not a non-multi-pulse type; and
determining that the pulse type is an off-start multi-pulse type if the pulse type of the multi-pulse interval is neither the non-multi-pulse type nor the on-start multi-pulse type.

22. An optical drive for recording/reproducing data with respect to optical recording media, the drive comprising:
a generator which generates elements of a write pulse;
a controller which generates a control signal to generate the write pulse according to a type and a recording speed factor of an optical recording medium loaded in the optical drive; and
a light unit which selects ones of the generated elements according to the control signal so as to generate the write pulse,
wherein the controller includes data enabling the controller to generate, according to the determined type of the optical recording medium, a first control signal for a multiple-pulse type write pulse and a second control signal for a non-multi-pulse type write pulse.

23. The optical drive of claim 22, wherein the generator generates a read current, a peak current, an erase current, a cooling current, and a bottom current as the elements to be selected to form the write pulse.

24. The optical drive of claim 22, wherein the controller selects and stores data in a register according to the determined type of the optical recording medium, and generates the control signal according to the stored data in the register.

25. The optical drive of claim 22, wherein the generator communicates the elements to the light unit over corresponding channels.

26. The optical drive of claim 25, wherein the generator communicates the elements to the light unit as currents over the corresponding channels, and the generator further comprises a voltage dividing unit at one of the channels so as to create separate control currents for the one channel.

27. The optical drive of claim 22, wherein the controller includes data enabling the controller to generate, according to the determined type of the optical recording medium, additional control signals in which one of the elements to be selected in the write pulse has one of an increased level, a decreased level, and a changed width as compared to a reference level for the one element.

28. The optical drive of claim 22, wherein the controller, according to a type and recording speed of the optical recording medium, determines reference level for the control signal to be generated, and selectively increases, decreases, and changes a width of intervals from the reference level within the write pulse to be generated to so as control the write pulse to be generated from the elements.

29. The optical drive of claim 22, wherein:
if the controller determines the type of the optical recording medium to need the multi-pulse type write pulse, the controller further determines
if the needed multi-pulse type write pulse is an on-start pulse type, which on-start type multi-pulse write pulse is needed, and
if the needed multi-pulse type write pulse is an off-start pulse type, which off-start type multi-pulse write pulse is needed; and
if the controller determines the type of the optical recording medium to need the non-multi-pulse type write pulse, the controller further determines which non-multi-pulse write pulse is needed.

* * * * *

UNITED STATES PATENT AND TRADEMARK OFFICE
CERTIFICATE OF CORRECTION

PATENT NO. : 7,145,857 B2  
APPLICATION NO. : 10/330347  
DATED : December 5, 2006  
INVENTOR(S) : Jin-gyo Seo Page 1 of 1

It is certified that error appears in the above-identified patent and that said Letters Patent is hereby corrected as shown below:

Title Page, Column 2 (Foreign Patent Documents), Line 16, change "2003-176530" to --2003-173530--.

Signed and Sealed this

Twenty-seventh Day of March, 2007

JON W. DUDAS  
*Director of the United States Patent and Trademark Office*